(No Model.)

W. M. WALLACE.
MOLD FOR FORMING GLASS SCREW CAPS.

No. 270,162. Patented Jan. 2, 1883.

WITNESSES.
Geo. K. Storm.
Elisha B. Howard.

William M. Wallace INVENTOR
by
Howard Boos ATTORNEYS.

UNITED STATES PATENT OFFICE.

WILLIAM M. WALLACE, OF BRIDGEPORT, OHIO, ASSIGNOR TO C. M. RHODES, OF SAME PLACE.

MOLD FOR FORMING GLASS SCREW-CAPS.

SPECIFICATION forming part of Letters Patent No. 270,162, dated January 2, 1883.

Application filed October 10, 1882. (No model.)

*To all whom it may concern:*

Be it known that I, WILLIAM M. WALLACE, a resident of Bridgeport, in the county of Belmont and State of Ohio, have invented certain new and useful Improvements in Molds for Forming Glass Screw-Caps; and I do hereby declare that the following is a full, clear, and exact description of the invention, which will enable others skilled in the art to which it appertains to make and use the same, reference being had to the accompanying drawings, and to letters of reference marked thereon, which form a part of this specification.

My invention relates to the construction of a glass-mold for making internally-threaded pressed-glass screw-caps for use on fruit-jars and other like articles.

Figure 1:
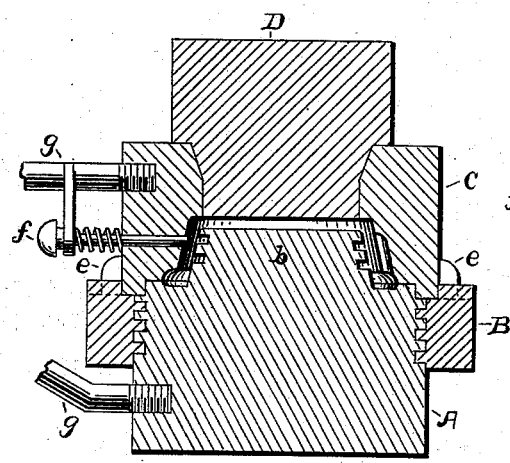
Figure 2:
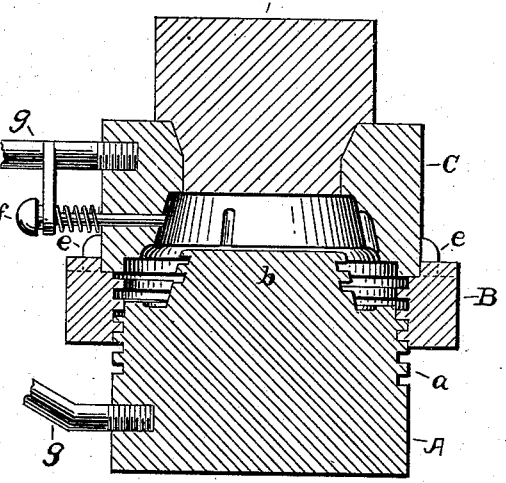
Figure 3:
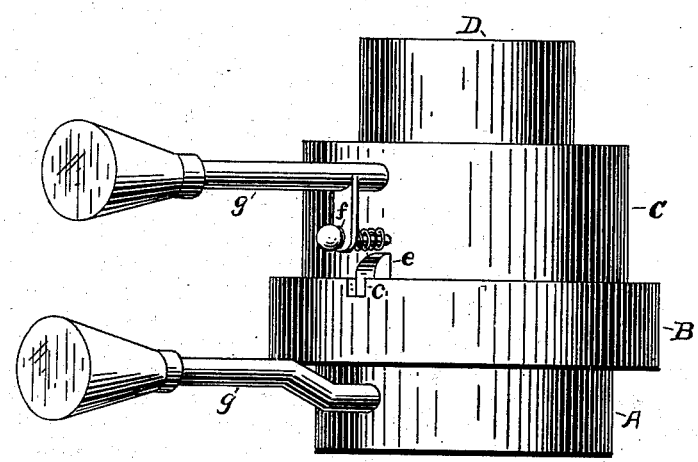

In the drawings, Figures 1 and 2 are vertical sectional views, and Fig. 3 an exterior view, of the mold.

Like letters of reference refer to like parts.

The letter A designates a circular iron base of suitable size, greater in diameter than the interior portion of the mold, provided with a screw-thread on its outer periphery, $a$, and having a threaded screw-stem or die, $b$, in its center to form the inside of the cap.

B is an annular ring, with a central opening of the same diameter as the base, having an inside screw-thread of the same pitch as that on the outside of the base A and on the screw-stem $b$, and is adapted to run up and down on the outside of the base as required.

$c\ c$ are slots or indents in the top edge, to receive pins which connect it with the upper portion or section of the mold.

C is the upper portion of the mold, containing the cavity for forming the cap, which is turned out on the inside the desired shape to form the outside of the screw-cap, and is provided with an opening in the center of the top for the admission of the plunger D on the glass-press. This circular open mold rests in a seat on the ring B, and is provided with two or more pins, $e\ e$, which drop in slots on the top of the ring B, to hold it stationary and permit of it turning with the movable ring as it rotates around the base.

$f$ is a small push-pin, running through the side of the open mold, for the purpose of holding the completed cap in the mold while it is being lifted from the stem die or base. It is operated by a slight push or pull of the thumb during the operation of pressing. A small spring holds the pin away from the glass when its pressure is not needed.

The upper and lower portion of the mold A and C are each provided with a suitable handle, $g\ g$, to facilitate the operation of moving the molds.

In Fig. 1 the mold is shown with the parts in position to form the cap. The molten glass is dropped into the mold-cavity and the plunger D brought down upon it, which forces it down and around the stem-die $b$ and presses the glass to the desired shape. While the glass is cooling or setting in the mold the workman takes hold of the handles, and, while holding the lower one steady, he first turns the open mold-section C a slight turn in the direction to unscrew it from the base, in order to prevent the glass from hugging to the stem-die while it is cooling; then, as the glass gets set, he rotates the upper part sufficiently far around—about one turn or revolution—to disengage the stem-die from the glass. (Shown fully in Fig. 2.) He then lifts the open mold-section from the ring B, removes the pressure of the spring-actuated pin, and permits the finished cap to drop out. The open mold C is then placed on the ring B, with the steady-pins in their sockets, and with a turn of the handle the movable parts C and B are run down into position to repeat the operation.

To prevent the glass cap from turning in the mold during the operation of unscrewing the open mold from the stem-die, small grooves are formed in the side of the open mold, which form ribs on the exterior of the cap and thus prevent it from turning in the mold. This mode of holding the cap is fully set forth and claimed in United States Patent to me No. 264,379, September 12, 1882.

Any device or trade-mark can be placed on the end of the plunger or on the top of the stem-die, if found desirable, and thus press the same in the glass cap.

One very important advantage of this form of mold is that it does not materially differ from the glass-molds in general use in this respect, that the portion of the mold containing the finished article can be lifted from the other portion in order to remove the article from the mold-cavity, this being the general practice with pressed-glass molds, and therefore the aid of specially skilled workmen is not necessary, there being no complicated parts or expensive machinery to operate. The open mold being separate from the movable ring, as herein shown, permits it being readily taken off and replaced, which would not be the case if the movable ring formed part of the open mold or was permanently attached to the same, on account of having to unscrew the open mold entirely off the base in order to remove the finished article, and the additional trouble of fitting the screw on again every time the mold was replaced. Other advantages—such as simplicity of construction and mode of operation—are obvious, and need not specially be referred to.

Having described my invention, what I claim, and desire to secure by Letters Patent of the United States, is—

1. In a mold for making glass screw-caps, a circular base, A, having a screw-thread around its outer periphery, and a central stationary stem-die, $b$, of suitable size to form the inside of the screw-cap, a movable ring, B, having one or more slots or indents in its edge, and provided with a female screw corresponding to that on the base and stem-die and adapted to rotate on the threaded base A, and a circular removable open mold, C, provided with steady-pins $e\ e$, to engage it with the movable ring B, substantially as and for the purpose herein set forth.

2. As a means of holding the glass within a removable mold, the spring-pin $f$, passing through the wall of such mold and adapted to be pressed inwardly.

In testimony that I claim the foregoing as my own I hereunto affix my signature in presence of two witnesses.

WILLIAM M. WALLACE.

Witnesses:
 C. M. RHODES,
 GEO. K. STORM.